( 12 ) United States Patent
Izuno et al.

(10) Patent No.: US 9,421,458 B2
(45) Date of Patent: *Aug. 23, 2016

(54) GAME SYSTEM, COMPUTER-READABLE NON-TRANSITORY STORAGE MEDIUM HAVING STORED THEREIN GAME PROGRAM, GAME PROCESS CONTROL METHOD, AND GAME APPARATUS

(71) Applicant: NINTENDO CO., LTD., Kyoto (JP)

(72) Inventors: Toshiharu Izuno, Kyoto (JP); Tomomi Sano, Kyoto (JP); Tomohiro Yamamura, Kyoto (JP); Hiroyuki Takahashi, Tokyo (JP); Shugo Takahashi, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 125 days.

This patent is subject to a terminal disclaimer.

(21) Appl. No.: 13/868,456

(22) Filed: Apr. 23, 2013

(65) Prior Publication Data

US 2014/0171193 A1 Jun. 19, 2014

(30) Foreign Application Priority Data

Dec. 19, 2012 (JP) .................................. 2012-276956

(51) Int. Cl.
```
A63F 9/24       (2006.01)
A63F 13/00      (2014.01)
G06F 17/00      (2006.01)
G06F 19/00      (2011.01)
A63F 13/20      (2014.01)
A63F 13/40      (2014.01)
```
(52) U.S. Cl.
CPC ................. *A63F 13/06* (2013.01); *A63F 13/10* (2013.01); *A63F 2300/1075* (2013.01); *A63F 2300/204* (2013.01); *A63F 2300/6045* (2013.01); *A63F 2300/64* (2013.01); *A63F 2300/8011* (2013.01)

(58) Field of Classification Search
USPC .......................................................... 463/31
See application file for complete search history.

(56) References Cited

U.S. PATENT DOCUMENTS

2004/0176165 A1* 9/2004 Takahashi et al. .............. 463/36

FOREIGN PATENT DOCUMENTS

JP 3511518 1/2004

OTHER PUBLICATIONS

Levi Buchanan, "Let's Golf! 2 iPhone Review," Jul. 26, 2010, http://www.ign.com/articles/2010/07/26/lets-golf-2-iphone-review.*
AppBuddy, "Lets Golf 2 App Review," Nov. 25, 2010, https://www.youtube.com/watch?v=oc8lzVdwYLM.*

* cited by examiner

*Primary Examiner* — Kevin Y Kim
(74) *Attorney, Agent, or Firm* — Nixon & Vanderhye P.C.

(57) ABSTRACT

A first input image is displayed in a predetermined area on a touch screen, and a second input image in which images in a plurality of areas are drawn so as to be distinguishable from each other by a player is displayed in accordance with a touch input on the first input image instead of the first input image. It is determined whether a touch input has been performed on any of the images in the plurality of areas of the second input image, and a process is performed in accordance with the touched image in the area. Then, a predetermined object is controlled on the basis of a timing of the touch input on the second input image and a result of the process corresponding to the touched image in area.

17 Claims, 8 Drawing Sheets

F I G. 10 ded on Dec. 19, 2012, is incorporated herein by
GAME SYSTEM, COMPUTER-READABLE NON-TRANSITORY STORAGE MEDIUM HAVING STORED THEREIN GAME PROGRAM, GAME PROCESS CONTROL METHOD, AND GAME APPARATUS

CROSS REFERENCE TO RELATED APPLICATION

The disclosure of Japanese Patent Application No. 2012-276956, filed on Dec. 19, 2012, is incorporated herein by reference.

FIELD

The exemplary embodiments disclosed herein relate to a game system, a computer-readable non-transitory storage medium having stored therein a game program, a game process control method, and a game apparatus, which use a touch panel, and more particularly relate to a game system, a computer-readable non-transitory storage medium having stored therein a game program, a game process control method, and a game apparatus, which control an object by performing a plurality of touch inputs in synchronization with predetermined timings.

BACKGROUND AND SUMMARY

Hitherto, a game apparatus is known in which a predetermined operation is completed by pressing a button at appropriate timings a plurality of times. An example of such an operation is a shot operation in a golf game. Specifically, an operation for making a shot on a golf ball is completed by consecutively performing, within a predetermined time, three input operations, namely, a first input for starting a shot, a second input for determining a shot power, and a third input for determining a hitting point on a ball.

Figure 9:
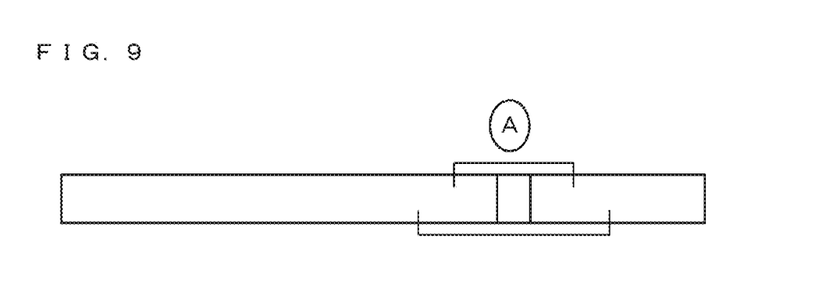
FIG. 9 shows an example of a display in a conventional game.
Figure 10:
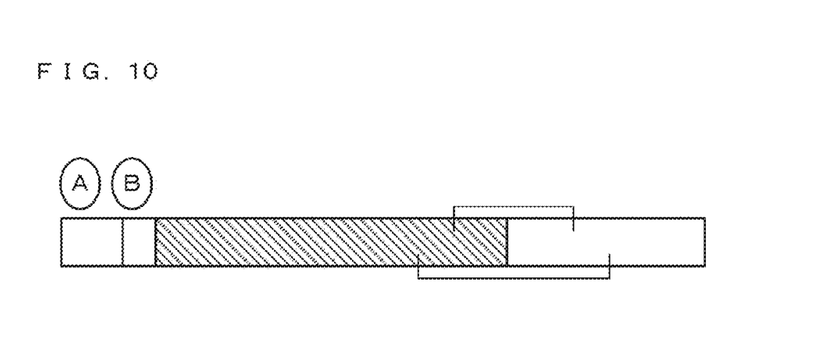
FIG. 10 shows an example of a display in the conventional game.

Meanwhile, in the above game, in addition to the shot operation by three inputs as described above, a shot operation requiring two inputs is also used. These operations are called an automatic shot operation and a manual shot operation. The former is an operation mode for beginners, and a hitting point is determined automatically. In other words, it is an operation mode in which it is unnecessary to perform the above third input. Meanwhile, the latter is an operation mode for advanced players, in which the above third input is necessary. With regard to selection of an operation mode, in the above game, either mode is selected on the basis of whether an A button or a B button is pressed at the above second input. Specifically, in the above game, a gauge shown in FIG. 9 is displayed in a lower portion of a game screen. In FIG. 9, "A" is displayed on the upper right side of the gauge. This display of "A" is intended to prompt a player to press the A button. Then, when the player presses the A button as a first input in this state, a shot operation is started, and the display of the gauge changes as shown in FIG. 10. In FIG. 10, "A" and "B" are displayed near the left end of the gauge. This display of "A" and "B" is intended to prompt the player to press either the A button or the B button. Then, when the player presses the A button, a shot power is determined and the automatic shot operation is selected. On the other hand, when the player presses the B button, a shot power is determined and the manual shot operation is selected. As described above, two operation modes are prepared, thereby providing a golf game that is allowed to be enjoyed by both beginners and advanced players.

In the above game, an operation mode is selected at an input in the middle of an operation in which inputs are consecutively performed within a certain time. In other words, after the A button is pressed as a first input, two choices of the A button and the B button are presented to the player at a second input. In such a case, there is a case where the player does not remember the arranged positions of the buttons, a case where the second input is not performed within a time, or a case where an input cannot be performed at an intended timing. For example, with a controller in which four buttons of "A", "B", "X", and "Y" are arranged, a case will be assumed in which a player does not remember the arranged position of the B button. In such a case, after a display for prompting the above second input is performed, the player who desires to press the B button at the above second input looks aside from the gauge and visually confirms the arrangement of the buttons (the position of the B button) on the controller. Then, the player places their finger on the B button, looks at the gauge again, and presses the B button at an appropriate timing. In such movements, time loss occurs due to the confirmation of the button arrangement. Thus, in an operation that requires an input within a predetermined time (namely, an operation in which a time limit is set for an input), there could be, for example, a case where the input is not performed within the time. From such a standpoint, there is room for further enhancing the operability of an operation that requires a plurality of inputs within a time limit as described above.

Therefore, it is a feature of the exemplary embodiments to provide a game program and the like that allow the operability of an operation, which requires a plurality of inputs within a time limit in order to complete a certain motion, to be enhanced.

In order to attain the feature described above, the following configuration examples are exemplified.

A configuration example is a game system which causes a player to perform, within a predetermined time, a plurality of inputs including at least one input to be performed in synchronization with a predetermined timing and performs a predetermined game process in accordance with a result of the plurality of inputs. The game system includes a first input image display section, a second input image display section, a determination section, a branch process execution section, and an object control section. The first input image display section is configured to display a first input image in a predetermined area on a touch screen. The second input image display section is configured to display a second input image in which images in a plurality of areas are drawn so as to be distinguishable from each other by the player, in the predetermined area in accordance with a touch input on the first input image. The determination section is configured to determine whether a touch input has been performed on any of the images in the plurality of areas constituting the second input image. The branch process execution section is configured to perform a process in accordance with the image in the area on which the touch input has been performed. The object control section is configured to control a predetermined object in a game space on the basis of a timing of the touch input on the second input image and a result of the process performed by the branch process execution section.

According to the above configuration example, it is possible to enhance the operability of an operation that is for causing an object in a game space to perform a certain motion and requires a plurality of inputs within a predetermined time. Particularly, in the case where a limit is set for a time for input, even when the player does not remember the arrangement of physical operation buttons, the player is allowed to complete a predetermined motion by paying attention to only the predetermined area on the touch screen and only performing a touch operation on the predetermined area.

In another configuration example, the game system may further include an input timing information presentation section configured to present information showing an input timing for a touch input on the second input image. The determination section may determine whether a touch input has been performed on any of the plurality of areas constituting the second input image within a predetermined time after a touch input is performed on the first input image, and when the touch input has been performed on the second input image within the predetermined time after the touch input is performed on the first input image, the branch process execution section may perform a process corresponding to the image in the area on which the touch input has been performed. In addition, the input timing information presentation section may display an image for presenting the information showing an input timing for a touch input, at a predetermined position outside the predetermined area on the touch screen, or may display an image for presenting the information showing an input timing for a touch input, such that the image is superimposed on the second input image.

According to the above configuration example, the player is allowed to grasp a timing for performing a touch input, and thus it is possible to further enhance the operability.

In another configuration example, the second input image may include a first area image and a second area image. The branch process execution section may set a predetermined value as a parameter for controlling movement of the object when a touch input is performed on the first area image, may display a third input image in the predetermined area when a touch input is performed on the second area image, may receive a touch input of the player on the third input image, and may calculate a touch position and a timing of a touch input when the touch input is performed on the third input image. When the touch input is performed on the first area image, the object control section may control movement of the object on the basis of a timing at which the touch input is performed on the first area image and the parameter set by the branch process execution section; and when the touch input is performed on the second area image, the object control section may control movement of the object on the basis of a timing at which the touch input is performed on the second area image and the touch position and the timing of the touch input on the third input image which are calculated by the branch process execution section.

According to the above configuration example, for example, it is possible to cause the player to make a selection from different operation systems in the middle of a plurality of touch input operations, and to present an input screen corresponding to the selected operation system. By so doing, a player who is not familiar with an operation method is allowed to perform various operations, and thus it is possible to enhance the fun of the game.

In another configuration example, a game executed by the game system may be a golf game; and the plurality of inputs may be inputs for making a shot on a golf ball.

According to the above configuration example, particularly, a player who is not familiar with a method of an operation for a shot on a ball in the golf game is allowed to complete the operation for a shot on a ball. Thus, the golf game is allowed to be easily enjoyed by the player.

Another configuration example is a game system which causes a player to perform, within a predetermined time, a plurality of inputs including at least one input to be performed in synchronization with a predetermined timing and performs a predetermined game process in accordance with a result of the plurality of inputs. The game system includes a first input image display section, a second input image display section, a third input image display section, and an object control section. The first input image display section is configured to display a first input image in a predetermined area on a touch screen. The second input image display section is configured to display a second input image in the predetermined area in accordance with a touch input on the first input image. The third input image display section is configured to display a third input image in the predetermined area in accordance with a touch input on the second input image. The object control section is configured to control a predetermined object in a game space on the basis of a timing of the touch input on the second input image and a touch position and a touching timing of a touch input on the third input image.

According to the above configuration example, it is possible to enhance the operability of an operation that is for causing an object in a game space to perform a certain motion and requires a plurality of inputs within a predetermined time.

In another configuration example, the game system may further include a first input timing information presentation section configured to present information showing an input timing for a touch input on the second input image; and a second input timing information presentation section configured to present information showing an input timing for a touch input on the third input image. The third input image display section may display the third input image when a touch input is performed on the second input image within a predetermined time after a touch input is performed on the first input image, and the object control section may control the object when a touch input is performed on the third input image within a predetermined time after the touch input is performed on the second input image. In addition, each input timing information presentation section may display an image for presenting the information showing an input timing for a touch input, at a predetermined position outside the predetermined area on the touch screen, or the first input timing information presentation section may display an image for presenting the information showing an input timing for a touch input, such that the image is superimposed on the second input image, and the second input timing information presentation section may display an image for presenting the information showing an input timing for a touch input, such that the image is superimposed on the third input image.

According to the above configuration example, the player is allowed to grasp a timing for performing a touch input, and thus it is possible to further enhance the operability.

According to the present embodiment, it is possible to enhance the operability of an operation that requires a plurality of inputs within a time limit. Particularly, a player who is not familiar with an operation method using an operation button is allowed to complete a plurality of inputs within a time without bothering the player.

DETAILED DESCRIPTION OF NON-LIMITING EXAMPLE EMBODIMENTS

Hereinafter, embodiments will be described. First, prior to detailed description of each embodiment, the configuration of a game apparatus used commonly in each embodiment will be described.

Figure 1:
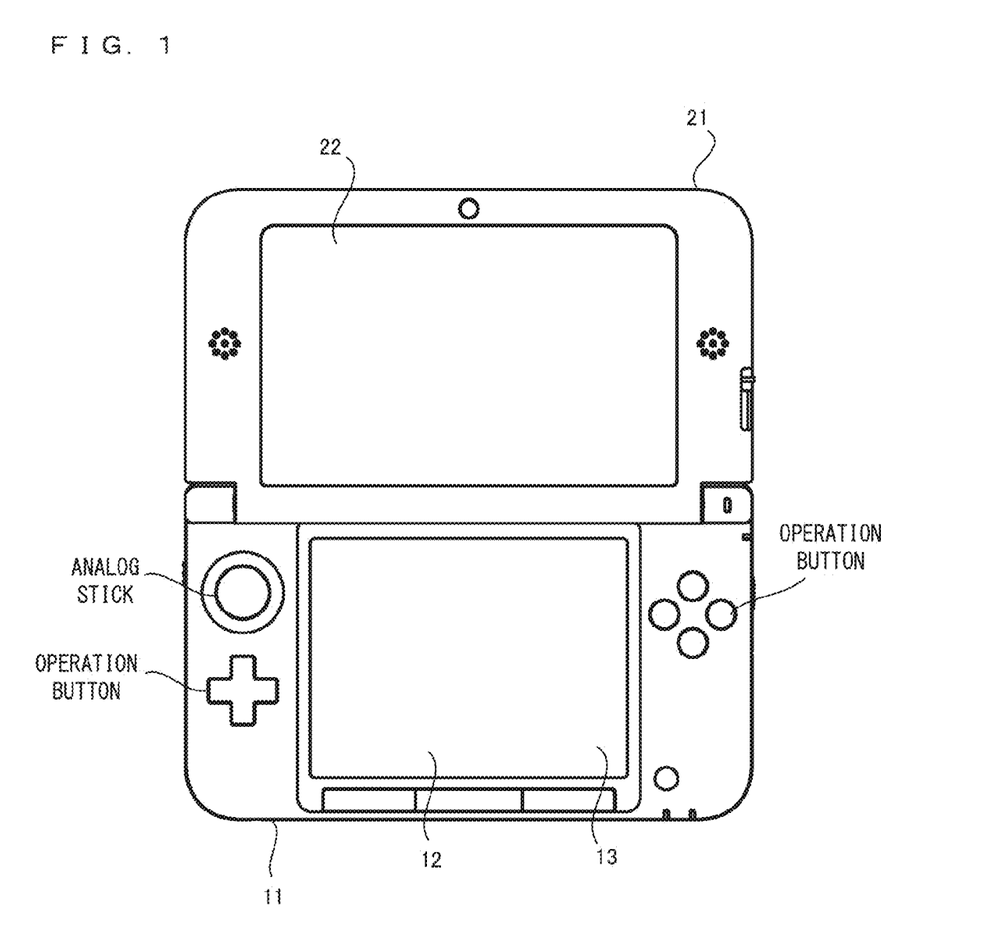
FIG. 1 is an external view of a hand-held game apparatus 10 according to each embodiment.

A game apparatus 10 assumed in each embodiment is a hand-held game apparatus. As shown in FIG. 1, the hand-held game apparatus 10 includes a lower housing 11 and an upper housing 21. The lower housing 11 and the upper housing 21 are connected to each other so as to be openable and closable (foldable). A lower LCD (Liquid Crystal Display: liquid crystal display device) 12 and a touch panel 13 are provided in the lower housing 11. In addition, in the lower housing 11, each operation button, an analog stick, and the like are also provided. Meanwhile, an upper LCD (Liquid Crystal Display: liquid crystal display device) 22 is provided in the upper housing 21.

Figure 2:
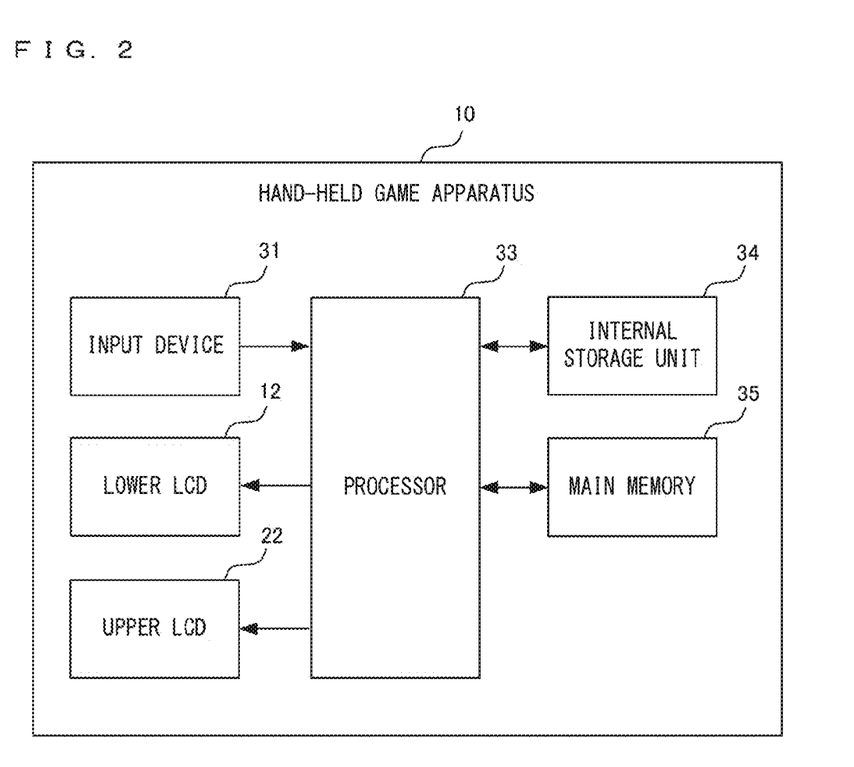
FIG. 2 is a block diagram showing a non-limiting example of the configuration of the hand-held game apparatus 10.

FIG. 2 is a schematic diagram showing the internal electrical configuration of the game apparatus. In FIG. 2, the hand-held game apparatus 10 includes an input device 31, the lower LCD 12, the upper LCD 22, a processor 33, an internal storage unit 34, and a main memory 35.

The input device 31 is operated by the user of the hand-held game apparatus 10 and outputs a signal corresponding to the operation of the user. The input device 31 is, for example, the touch panel 13, each operation button, and the analog stick in FIG. 1. The lower LCD 12 and the upper LCD 22 displays, on screens thereof, images generated in the hand-held game apparatus 10. In the internal storage unit 34, a computer program to be executed by the processor 33 is stored. The internal storage unit 34 is typically a flash EEPROM. Instead of the internal storage unit 34, an attachable/detachable storage medium (e.g., a memory card) may be used. The main memory 35 temporarily stores the computer program and information.

Each embodiment described below relates to a process that realizes the following operation by using the lower LCD 12 and the touch panel 13 in the game apparatus configured as described above. An operation assumed in each embodiment is an operation for causing a player character to perform a predetermined motion (hereinafter, referred to as intended motion). By consecutively performing a plurality of inputs within a predetermined time, it is possible to cause the player character to perform the intended motion. In other words, the operation for causing the player character to perform the intended motion consists of a plurality of input operations.

In each embodiment, a series of operations for causing the player character to perform the intended motion as described above are realized as follows. First, an area of a portion of the lower LCD 12 (it may be the entirety thereof) is previously defined as an area for operation (hereinafter, referred to as operation area). Then, an image for touch input (hereinafter, referred to as input image) is displayed in the operation area. At that time, input images corresponding to the plurality of input operations, respectively, are displayed as appropriate. This is intended to allow the player to complete the intended motion only by performing a touch operation on the operation area (an input image displayed in the operation area) at an appropriate timing. Thus, when the player pays attention to the operation area, even if the player does not remember the arrangement of a physical button (the arrangement of the A button or the B button), it is possible for the player to smoothly perform an operation that requires a plurality of inputs within a time limit.

First Embodiment

Figure 3:
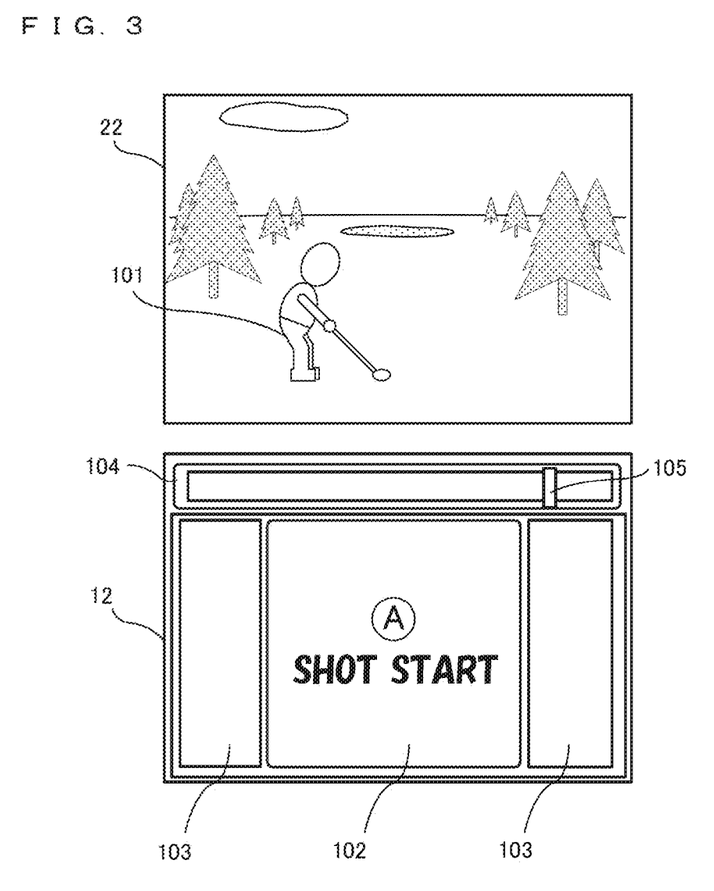
FIG. 3 is a diagram showing a non-limiting example of a game screen according to a first embodiment.

Hereinafter, a first embodiment will be described. In the present embodiment, a golf game is assumed. As the above intended motion, a motion of making a shot on a golf ball is assumed. FIG. 3 is a diagram showing an example of a screen of the golf game in the present embodiment. FIG. 3 shows a scene in which a player character makes a shot. In FIG. 3, a player character 101 on a golf course is displayed on the upper LCD 22. In addition, a first operation area 102 is displayed on the lower LCD 12. Furthermore, second operation areas 103 are displayed on the right and left sides of the first operation area 102. Moreover, a gauge 104 is displayed above the first operation area 102. A cursor 105 is included in the gauge 104 (the gauge 104 and the cursor 105 are used for showing an input timing and the like of the player). The player performs a later-described shot operation by performing a touch operation on various input images displayed in the first operation area 102.

In the present embodiment, as the intended motion, a motion of making a shot on a golf ball is assumed as described above, and a series of operations for this motion (hereinafter, referred to as shot operation) basically consist of the following three input operations. First, the first one is a first input operation that is an input for starting a shot. An operation subsequent to the first input operation is a second input operation for determining a shot power. It is noted that the second input operation also serves as an operation of selecting a "shot operation mode", which is described later. An operation subsequent to the second input operation is a third input operation for determining a hitting point on a golf ball. When these three input operations are sequentially performed within a time limit, the power to hit the golf ball and the hitting point on the golf ball are determined, and on the basis of them, a motion is performed in which the player object makes a shot on the golf ball.

Meanwhile, in the present embodiment, two modes are prepared as "shot operation modes". Hereinafter, one of them is referred to as "manual shot", and the other is referred to as "easy shot". The "manual shot" is a mode in which a shot operation consists of the three input operations described above. The "easy shot" is a mode in which the above third input operation is omitted. In other words, the "easy shot" is a mode in which a shot operation consists of two operations, namely, the above first input operation and the above second input operation. In the present embodiment, in this mode, the center on a golf ball is set as a hitting point on the golf ball. Similarly to conventional golf games, the setting of these modes allows the game to be played by both beginners who have not got used to operations and advanced players who have got used to operations. In other words, in the present embodiment, it is assumed that as operation modes for a shot operation, there are two operation modes, namely, the "easy shot" in which a shot operation consists of two input operations and the "manual shot" in which a shot operation consists of three input operations. In the present embodiment, for making a selection from these operation modes, an input image for the second input operation is presented to the player as described later.

Figure 4:
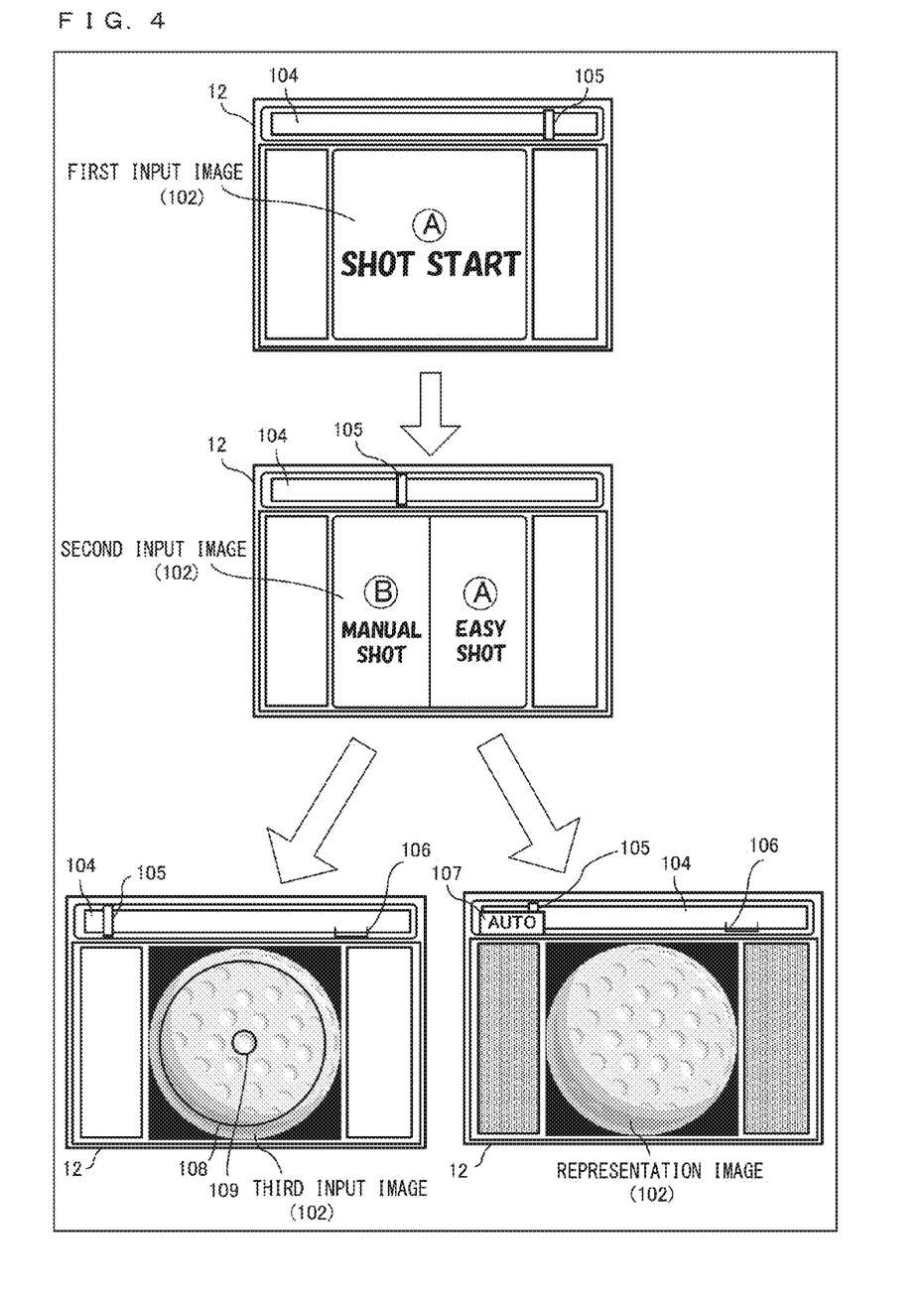
FIG. 4 is a diagram showing a non-limiting example of screen transition of a lower LCD 12 according to the first embodiment.
Figure 5:
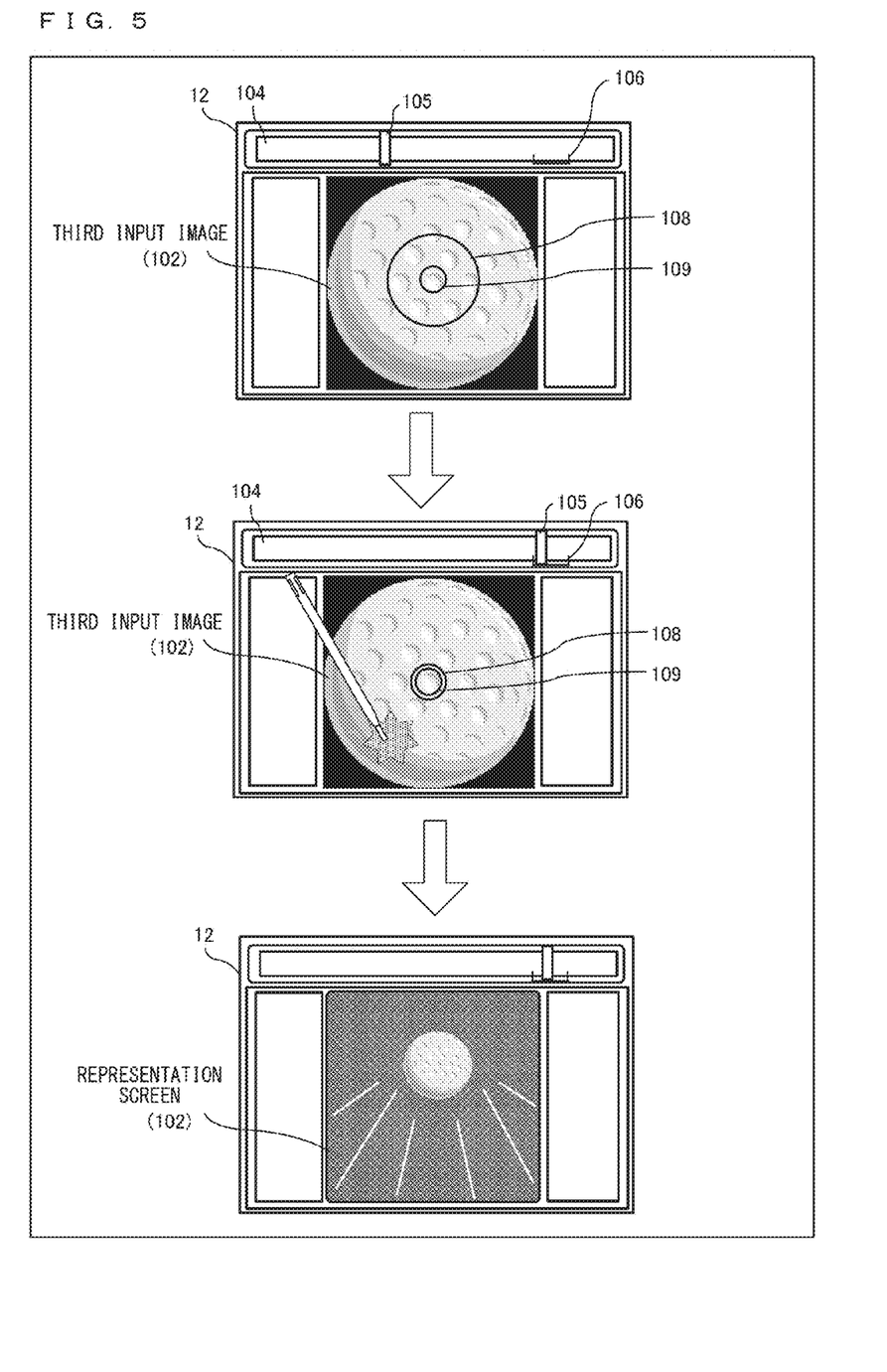
FIG. 5 is a diagram showing a non-limiting example of screen transition of the lower LCD 12 according to the first embodiment.

Hereinafter, flow of a process related to a "shot operation" in the first embodiment will be described with reference to FIGS. 4 and 5. FIGS. 4 and 5 are diagrams showing transition of the screen of the lower LCD 12 that is related to the shot operation. It is noted that a game program and data for performing a process related to operations described below are previously stored, for example, in a predetermined storage medium or the internal storage unit 34 and are loaded into the main memory 35 as appropriate according to need. Then, the processor 33 executes the loaded program to realize the process described below.

(First Input Operation)

First, in FIG. 4, a first input image is displayed in the first operation area 102 (the upper diagram in FIG. 4). This image is an image for receiving the above first input operation. In the first input image, a display for prompting a shot operation has been performed. When the player performs a touch operation on the first input image (the first input operation), the input is detected and a shot operation is started.

Here, "A SHOT START" is displayed in the first input image and indicates that the first input operation is allowed to be performed even by pressing the A button (not shown) (a display of an operation guide). In other words, in the present embodiment, the first input operation is allowed to be performed as a touch operation on the first input image or an operation of pressing a physical button. In another embodiment, a physical button may not be used for the first input operation, and the first input operation may be performed only as a touch operation (e.g., a case where the embodiment is applied to a tablet terminal or the like with a full screen touch panel which does not include any physical operation button).

In a state where the first input image is displayed, the cursor 105 on the gauge 104 is displayed so as to stop at a position near the right end of the gauge 104. Hereinafter, this position of the cursor 105 before a shot operation is started is referred to as "reference position".

It is noted that, for example, button images with which selection of a golf club, a display of a course map, and the like is allowed to be made are displayed in the second operation areas 103 as appropriate. The second operation areas 103 are basically not related to the process described in the present embodiment. Thus, the description regarding the second operation areas 103 is basically omitted but will be added according to need only when the second operation areas 103 are related to the process.

(Second Input Operation)

When the player touches the first input image and a shot operation is started, a second input image is displayed in the first operation area 102 (the middle diagram in FIG. 4). In the second input image, the first operation area 102 is displayed so as to be further split into left-half and right-half areas. "B MANUAL SHOT" is displayed in the left-half area, and "A EASY SHOT" is displayed in the right-half area. In other words, a branch of an operation mode is shown. Furthermore, at the same time as when the shot operation is started, the cursor 105 starts to move from the reference position toward the left end of the gauge 104. The player is allowed to stop the cursor 105 moving leftward by performing a touch operation on the second input image (the second input operation). A shot power is determined on the basis of the position of the cursor 105 at the time when the touch operation is performed. Specifically, the closer to the left end of the gauge 104 the position of the cursor 105 is, the greater the determined shot power is. When no touch operation is performed until the cursor 105 reaches the left end of the gauge 104, the cursor 105 inverts its moving direction at the left end of the gauge 104 and starts moving rightward. Furthermore, when no touch operation is performed even when the cursor 105 continues to move rightward and reaches the reference position, the shot operation is started again. In other words, the screen returns to a state where the first input image is displayed (the upper diagram in FIG. 4).

With a touch operation on the second input image, a shot operation mode is also selected together with the above-described determination of the shot power. In other words, when a touch operation is performed, it is determined in which of the two areas the touch position is included, and one operation mode is selected from the above "manual shot" and "easy shot" (i.e., a process to be subsequently performed is selected) on the basis of the result of the determination. Specifically, if the touch position is within the left-half area of the second input image, the "manual shot" is selected, and if the touch position is within the right-half area of the second input image, the "easy shot" is selected.

Similarly to the first input image, in the second input image, a touch operation and an operation on a physical button are used for the second input operation. Specifically, the A button corresponds to selection of the "easy shot" (and determination of a shot power), and the B button corresponds to selection of the "manual shot" (and determination of a shot power). The display shown in the second input image has a content that shows assignment of operation buttons (namely, an operation guide). Thus, if the B button is pressed, the same effect as that when a touch operation is performed on the left-half area of the second input image is obtained, and if the A button is pressed, the same effect as that when a touch operation is performed on the right-half area of the second input image is obtained.

Alternatively, in the second input image, the areas corresponding to the respective buttons may be displayed in different colors. For example, the background color of the left-half area of the second input image may be set in blue, and the background color of the right-half area of the second input image may be set in red. Since each operation button is associated with the (background) color, it is easy to intuitively grasp which button to press in performing an operation with an operation button.

(Third Input Operation: Manual Shot)

If the left-half area of the second input image is touched and the "manual shot" is selected, a third input image is displayed in the first operation area 102 as shown in the lower left diagram in FIG. 4. On the other hand, if the right-half area of the second input image is touched and the "easy shot" is selected, a representation image is displayed in the first operation area 102 as shown in the lower right diagram in FIG. 4. Hereinafter, each operation mode will be described.

First, a case where the "manual shot" is selected will be described. In this case, an image of a golf ball is displayed as the third input image as shown in the lower left diagram in FIG. 4. The player is allowed to determine an impact position by performing a touch operation at a desired position on the image of the golf ball (the third input operation). In accordance with the touched position, it is possible to change rotation or the like provided to the ball. For example, if any position on the upper half of the ball in the third input image is touched, it is possible to provide topspin to the ball (the closer to the upper edge the position is, the stronger the provided topspin is). In addition, if any position on the lower half of the ball is touched, it is possible to provide backspin to the ball (the closer to the lower edge the position is, the stronger the provided backspin is). Moreover, in accordance with the touch position in the left-right direction of the third input image, the degree of slice of the ball, the direction in which the ball rolls after the ball is landed, and the like are changed.

If a position on the third input image other than the position at which the ball is drawn is touched (any of black portions at the four corners in the lower left diagram in FIG. 4 is touched), the position is handled as a position within the ball image closest to the position.

On the basis of a timing at which the third input operation (the touch operation for determining an impact position) is performed in a state where the third input image is displayed, it is also determined whether the shot is accurate or missed. Specifically, with regard to the gauge 104, when a shot power is determined by the second input operation, the cursor 105 inverts its moving direction at the time when the second input operation is performed, and starts moving rightward. Simultaneously with this, a meeting area 106 is displayed. The meeting area 106 is an index for almost accurately hitting the ball. When no input is performed in a state where the second input image is displayed until the cursor 105 reaches the left end of the gauge 104, the cursor 105 inverts its moving direction. When the second input operation is performed after this inversion, the cursor 105 continues to move rightward. Then, the player performs the above touch operation (the third input operation) such that the cursor 105 stops within the meeting area 106. By so doing, it is possible to reduce inaccuracy of a shot. Particularly, when the cursor 105 is caused to stop at the center of the meeting area 106, it is possible to most accurately hit the ball. On the other hand, when the cursor 105 is caused to stop (touched) at a position outside the meeting area 106, a shot is missed, for example, a fat shot is hit. In another embodiment, even when the second input operation is performed, the cursor 105 may invert its moving direction after reaching the left end of the gauge 104. Alternatively, the meeting area 106 may be displayed from the beginning.

Meanwhile, in the third input image, two circle images, a timing circle 108 and a meeting circle 109, are also displayed in a superimposed manner. The timing circle 108 is displayed so as to gradually contract in conjunction with the above movement of the cursor 105. The degree of the contraction is set such that the timing at which the size of the timing circle 108 agrees with that of the meeting circle 108 coincides with the timing at which the cursor 105 arrives at the center of the meeting area 106. Thus, by the player performing the third input operation with reference to the timing circle 108 without necessarily paying attention to the movement of the cursor 105, it is possible to almost accurately hit the ball.

An example of transition of the screen displayed on the lower LCD 12 after the state of the lower left diagram in FIG. 4 will be described. FIG. 5 is a diagram showing transition of such a screen. When the second input operation is performed and the third input image is displayed, the cursor 105 moves rightward and the timing circle 108 gradually contracts toward the meeting circle 109 at the same time, as shown in the upper diagram in FIG. 5. Then, when the cursor 105 enters the meeting area 106 (the size of the timing circle 108 becomes close to the size of the meeting circle 109), the player touches a position on the ball image at which an impact is desired, as shown in the middle diagram in FIG. 5. By this, the shot operation is completed. Then, as shown in the lower diagram in FIG. 5, a scene in which the ball is flying away (a representation screen) is displayed in the first operation area 102. Parameters (a moving speed, a moving direction, rotation, and the like) related to the movement of the ball are determined on the basis of the shot power determined by the second input operation and the impact position and the impact timing determined by the third input operation.

(Easy Shot)

Next, a case where the "easy shot" is selected at the second input operation will be described. In this case, the third input operation is omitted. Thus, with regard to the above determination of an impact position and an impact timing, appropriate values that do not cause a shot to be missed are automatically determined. In the present embodiment, the center on the ball is set as an impact position. In addition, an impact timing is determined by a position within the meeting area 106 being randomly selected. It is noted that an impact position may also be randomly determined within a predetermined range having a center at the center on the ball.

If the "easy shot" is selected, the image shown in the lower right diagram in FIG. 4 is displayed in the first operation area 102. This image is an image of a golf ball, but the timing circle 108 and the like are not displayed therein. In addition, even when the player performs a touch operation on this image, the operation is not reflected in the game process. In other words, this image is merely a representation image. Moreover, an image 107 representing that it is the "easy shot" is also displayed near the left end of the gauge 104. The cursor 105 moves rightward, but a position within the meeting area 106 is randomly selected as described above, regardless of an operation of the player, and the cursor 105 automatically stops at the selected position. Then, a representation image representing that the ball is flying away is displayed as shown in the lower diagram in FIG. 5.

In another embodiment, the timing circle 108 and the meeting circle 109 may be displayed, and a display may be performed in which contraction of the timing circle 108 automatically stops when the size of the timing circle 108 agrees with that of the meeting circle 109.

As described above, in the present embodiment, a plurality of input images having different roles and functions are displayed in a switching manner in the first operation area 102 in accordance with a stage of input. By causing the player to perform only a touch operation on the first operation area 102, the intended motion consisting of several stages of inputs is allowed to be completed. In other words, only by the player performing a touch operation while paying attention to only the first operation area 102, the player is allowed to complete a set of the operations constituting the intended motion, even if the player does not remember the roles and the arrangement of the operation buttons. Particularly, the present embodiment is useful for a case where a time limit is set for an input time.

In addition, even in the case where there is a branch in an operation content due to a plurality of operation modes or the like, an input image corresponding to the branch is displayed. Thus, in this case as well, a player who does not grasp the arrangement or the like of the operation buttons is allowed to complete an intended operation only with a touch operation on the first operation area 102.

Second Embodiment

Next, a second embodiment will be described with reference to FIG. 6. In the above first embodiment, selection of an operation mode is performed at the second input operation. In contrast, in the second embodiment, before a shot operation is started, the player is previously caused to select an operation mode. For example, images for causing the player to select the operation mode are previously displayed in the second operation areas 103. Then, the player selects either the "manual shot" or the "easy shot" before starting a shot operation. A game apparatus according to the embodiment is the same as that of the above first embodiment. Thus, the same components are designated by the same reference numerals, and the detailed description thereof is omitted.

Figure 6:
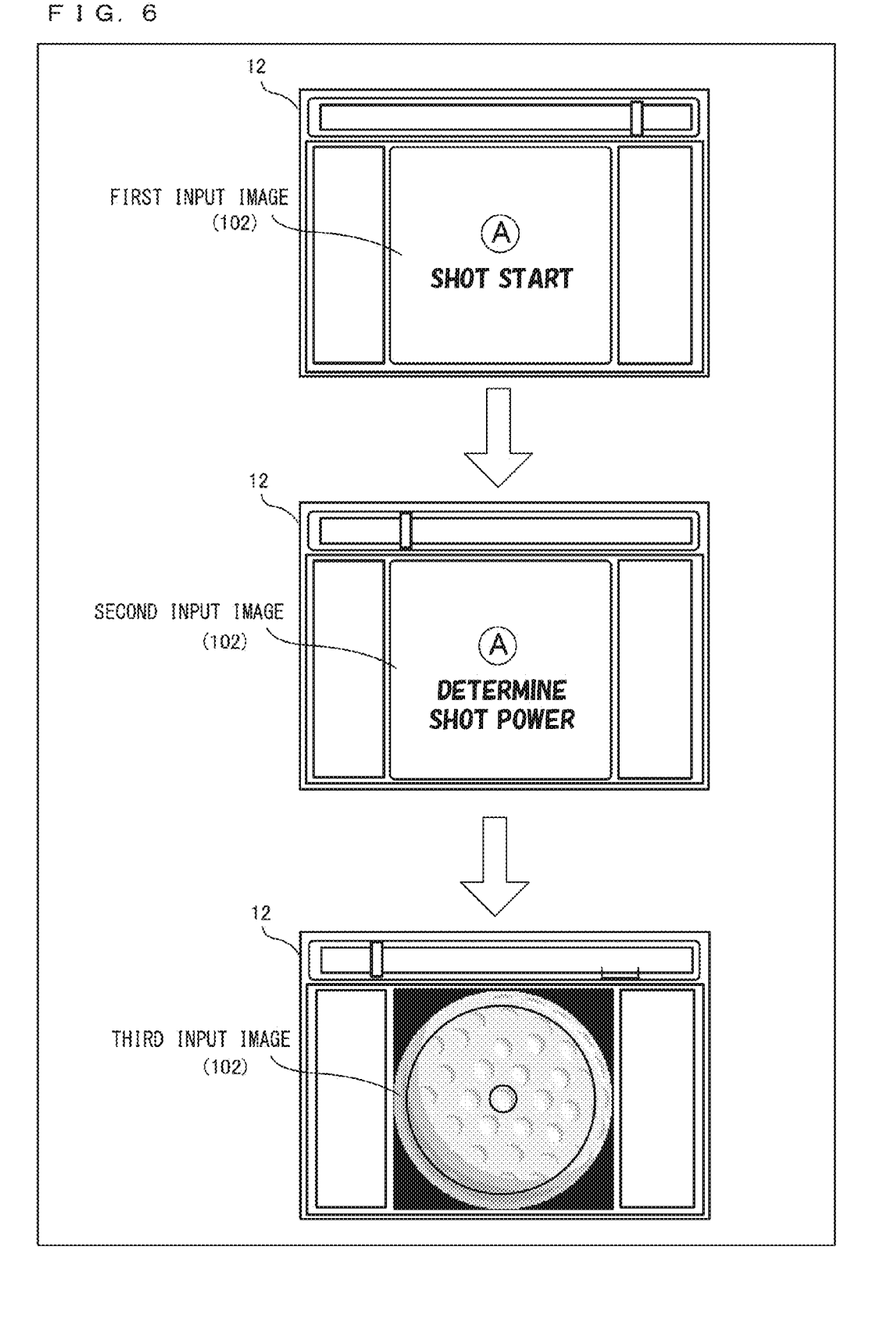
FIG. 6 is a diagram showing a non-limiting example of screen transition of the lower LCD 12 according to a second embodiment.

FIG. 6 is a diagram showing an example of transition of the screen of the lower LCD 12 when the "manual shot" is previously selected. In FIG. 6, a screen related to a first input operation (the upper diagram in FIG. 6) is the same as that of the above first embodiment. Then, when the player performs the first input operation, a screen is displayed as shown in the middle diagram in FIG. 6. In this screen, a second input image showing "A DETERMINE SHOT POWER" is displayed in the first operation area 102. In other words, a second input image that is not split into areas as in the first embodiment is displayed. Then, when the player performs a touch operation on this image, a shot power is determined, and a third input image is displayed as shown in the lower diagram in FIG. 6. The third input image is the same as that of the above first embodiment, and thus the description thereof is omitted.

As described above, in the second embodiment, the operation mode is previously selected. In such a case as well, input images related to the first input operation, the second input operation, and the third input operation are consecutively displayed at the same location, and the operations are performed. Thus, the same advantageous effects as those in the above first embodiment can be obtained.

In another example of the second embodiment, for the second input operation in FIG. 6 as well, an image of a golf ball may be a second input image as for the third input operation. In other words, at the second input operation, an image in which the timing circle 108 is expanding on the image of the golf ball may be displayed as a second input image, and then, the display may shift to a display in which the timing circle 108 contracts, as a third input image when the second input operation is performed or after the timing circle 108 expands to the outer circumference of the ball. By so doing, even when the player pays attention to the operation area from the beginning to the end, it is easy for the player to perform an operation, since the player can also see a timing for the second input operation. At that time, the size of the ball may be changed in accordance with a state (a fairway, the rough, or the like) of the ground. Specifically, when the state of the ground is bad, a period from the time when the timing circle 108 becomes large to the time when the timing circle 108 becomes small is shortened and hence an operation becomes difficult to perform, whereby it is possible to enhance the fun of the golf game.

Figure 7:
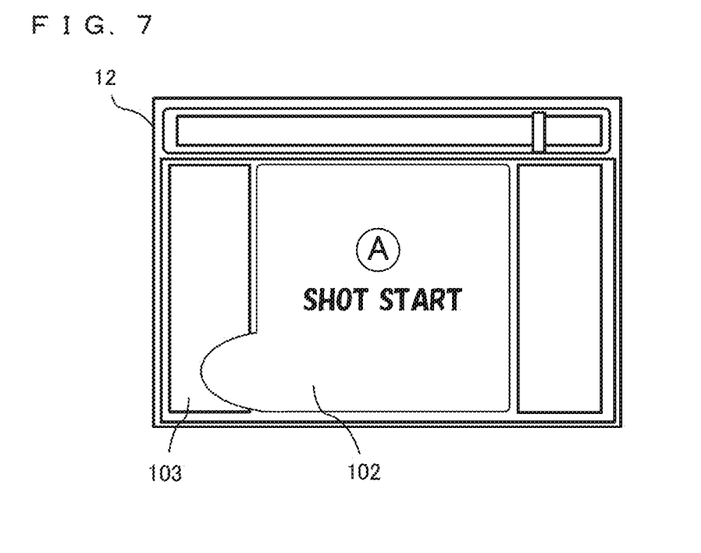
FIG. 7 is a diagram showing another non-limiting example of the game screen according to each embodiment.

With regard to the size and the shape of the first operation area 102, the following configuration may be used other than the area having the size and the shape shown in each embodiment described above. For example, when the first operation area 102 is split into a plurality of areas as shown as the second input image in the above first embodiment, a gap may be provided at the boundary between the areas. Taking the second input image shown in FIG. 4 as an example, a gap of about 1 to 2 bits may be provided at the boundary. In addition, although the first operation area 102 has substantially a square shape in each embodiment described above, the first operation area 102 may have, for example, the shape of a design in which a base shape is square but its portion is deformed, as shown in FIG. 7. In FIG. 7, the first operation area 102 is shaped such that the lower left portion is superimposed on (protrudes to) the lower right portion of the left second operation area 103. In this case, the area of the deformed portion may also be included as a target for a touch operation on the first operation area 102.

In addition, a display showing a timing for performing a touch operation may not necessarily be performed. For example, the gauge 104 may not be displayed, and the timing circle 108 and the meeting circle 109 in the third input image may not be displayed (a time limit for input is still set). In this case, with regard to an input timing, the player relies on only their sense to perform a touch operation.

Figure 8:
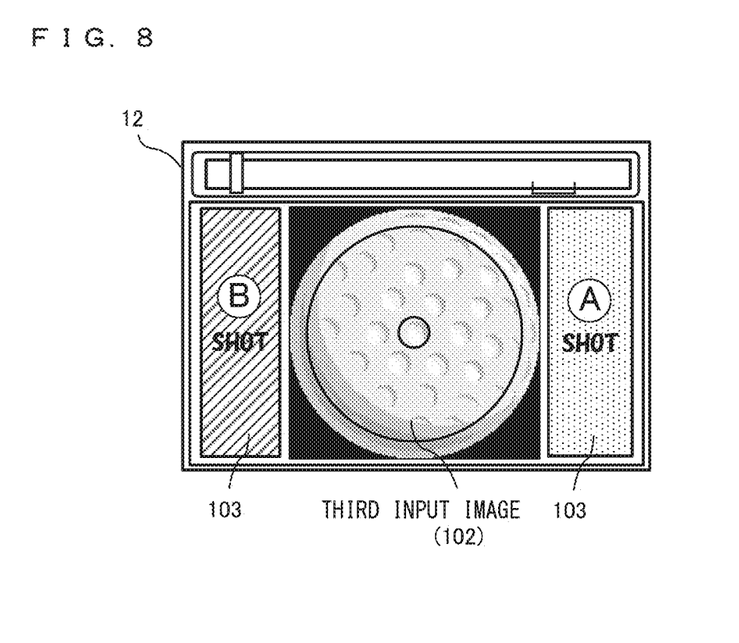
FIG. 8 is a diagram showing another non-limiting example of the game screen according to each embodiment.

When the third input image is displayed, an operation guide may be displayed in the second operation areas 103 as shown in FIG. 8. In the example of FIG. 8, the left second operation area 103 shows that a shot (impact) will be made if the B button is pressed. The right second operation area 103 shows that a shot (impact) will be made if the A button is pressed. In other words, in this case, it is shown that an impact operation will be performed even if either the A button or the B button is pressed. Thus, the player is allowed to perform the third input operation by pressing the A or B button while watching movement of the cursor 105 or the timing circle 108 (it is noted that in this case, an impact position may be fixed, for example, at the center on the ball). Moreover, when the second operation areas 103 are displayed, the right side and the left side may be in different colors. For example, the background color of the left second operation area 103 may be blue, and the background color of the right second operation area 103 may be red.

In addition to the golf game described as an example in each embodiment described above, the process in each embodiment described above is applicable to other games such as a batting operation in a baseball game and a serving operation in a tennis game. Furthermore, the above process is also applicable to a case where an operation for consecutive attacks such as so-called "combo" in a fighting game is performed with a touch panel. Particularly, the process described in the above first embodiment is useful for a case where an attack content branches (e.g., a combo of punch→punch→punch, a combo of punch→kick→kick, and the like).

In each embodiment described above, the hand-held game apparatus including two display devices has been described as an example. In another embodiment, a hand-held terminal or tablet terminal that includes a single display device and a touch panel on a screen of the display device may be used. Moreover, in each embodiment described above, the touch panel has been described as an example of a device that detects a designated position of the player on the operation area. However, the device may be a designating device with which the player is allowed to designate a position within a predetermined area, and may be, for example, a mouse that allows any position on a screen to be designated, a tablet that does not include a display screen and allows any position on an operation surface to be designated, or a designating device that includes an imaging means for remotely capturing an image of a display screen and a marker or the like located around the display screen and calculates a coordinate on the display screen corresponding to a pointed position on the display screen, from the positions of the display screen and the marker in a captured image obtained by pointing toward a direction to the display screen with the device.

What is claimed is:

1. A game system which causes a player to perform, within a predetermined time, a plurality of inputs including at least one input to be performed in synchronization with a predetermined timing and performs a predetermined game process in accordance with a result of the plurality of inputs, the game system comprising a memory device, an input device including a touch screen and a sensor, and a processing system that includes at least one processor coupled to the memory device and the touch screen, wherein the processor is configured to perform at least:

display a first input image in a predetermined area on the touch screen;

display a second input image in which images in a plurality of areas are drawn so as to be distinguishable from each other by the player, in the predetermined area in accordance with reception of an electrical signal indicating a sensed touch input on the first input image by the sensor;

determine whether a touch input has been performed on any of the images in the plurality of areas constituting the second input image based on a sensed touch input by the sensor;

branch process execution to perform a process in accordance with the image in the area on which the touch input has been performed; and programmatically compare the timing of the touch input performed on the second input image and the position of the touch input performed on the second input image against a list of known timing values of touch inputs and positions of touch inputs on the second input image stored in the memory device to perform object controlling a predetermined object in a game space on the basis of the timing of the touch input on the second input image and a result of the process performed by the branch process execution, wherein the second input image includes a first area image and a second area image, in response to said programmatically comparing, when a touch input is performed on the first area image and sensed by the sensor, the at least one processor is configured to control movement of the object based on the timing of the touch performed on the first area image; and when a touch input is performed on the second area image and sensed by the sensor, the at least one processor is configured to control movement of the object based on the timing of the touch performed on the second area image; and the position and timing of a touch performed on a third input image having a single periphery, said position being inside the single periphery.

2. The game system according to claim 1, the at least one processor further configured to perform input timing information presentation to present information showing an input timing for a touch input on the second input image, wherein the at least one processor determines whether a touch input has been performed on any of the plurality of areas constituting the second input image within a predetermined time after a touch input is performed on the first input image, and when the touch input has been performed on the second input image within the predetermined time after the touch input is performed on the first input image, the branch process execution performs a process corresponding to the image in the area on which the touch input has been performed.

3. The game system according to claim 2, wherein the input timing information presentation displays an image for presenting the information showing an input timing for a touch input, at a predetermined position outside the predetermined area on the touch screen.

4. The game system according to claim 2, wherein the input timing information presentation displays an image for presenting the information showing an input timing for a touch input, such that the image is superimposed on the second input image.

5. The game system according to claim 1, wherein the branch process execution sets a predetermined value as a parameter for controlling movement of the object when a touch input is performed on the first area image, displays a third input image in the predetermined area when a touch input is performed on the second area image, receives a touch input of the player on the third input image, and calculates a touch position and a timing of a touch input when the touch input is performed on the third input image, and when the touch input is performed on the first area image, the object control controls movement of the object on the basis of a timing at which the touch input is performed on the first area image and the parameter set by the branch process execution; and when the touch input is performed on the second area image, the object control controls movement of the object on the basis of a timing at which the touch input is performed on the second area image and the touch position and the timing of the touch input on the third input image which are calculated by the branch process execution.

6. The game system according to claim 1, wherein a game executed by the game system is a golf game; and the plurality of inputs are inputs for making a shot on a golf ball.

7. A game system which causes a player to perform, within a predetermined time, a plurality of inputs including at least one input to be performed in synchronization with a predetermined timing and performs a predetermined game process in accordance with a result of the plurality of inputs, the game system comprising a memory device, an input device including a touch screen and a sensor, and a processing system that includes at least one processor coupled to the memory device and the touch screen, wherein the processor is configured to perform at least:

display a first input image in a predetermined area on the touch screen;

display a second input image in the predetermined area in accordance with reception of an electrical signal indicating a sensed touch input on the first input image by the sensor;

display a third input image in the predetermined area in accordance with reception of an electrical signal indicating a sensed touch input on the second input image by the sensor; and programmatically compare the timing of the touch input performed on the second input image, and the timing and the touch position of the touch input performed on the third input image against a list of known timing values of touch inputs on the second input image and timing values and positions of touch inputs on the third input image stored in the memory device to perform object controlling a predetermined object in a game space on the basis of the timing of the touch input on the second input image and the touch position and the touching timing of a touch input on the third input image, wherein the second input image includes a first area image and a second area image, in response to said programmatically comparing, when a touch input is performed on the first area image and sensed by the sensor, the at least one processor is configured to control movement of the object based on the timing of the touch performed on the first area image; and when a touch input is performed on the second area image and sensed by the sensor, the at least one processor is configured to control movement of the object based on the timing of the touch performed on the second area image; and the position and timing of a touch performed on the third input image having a single periphery, said position being inside the single periphery.

8. The game system according to claim 7, the at least one processor further configured to perform:
first input timing information presentation to present information showing an input timing for a touch input on the second input image; and
second input timing information presentation to present information showing an input timing for a touch input on the third input image, wherein
the at least one processor causes the display of the third input image when a touch input is performed on the second input image within a predetermined time after a touch input is performed on the first input image, and
the object control controls the object when a touch input is performed on the third input image within a predetermined time after the touch input is performed on the second input image.

9. The game system according to claim 8, wherein
each input timing information presentation displays an image for presenting the information showing an input timing for a touch input, at a predetermined position outside the predetermined area on the touch screen.

10. The game system according to claim 8, wherein
the first input timing information presentation displays an image for presenting the information showing an input timing for a touch input, such that the image is superimposed on the second input image, and
the second input timing information presentation displays an image for presenting the information showing an input timing for a touch input, such that the image is superimposed on the third input image.

11. The game system according to claim 7, wherein
a game executed by the game system is a golf game; and
the plurality of inputs are inputs for making a shot on a golf ball.

12. A computer-readable non-transitory storage medium having stored therein a game program executed by a processing system that includes at least one processor of a game system, the game system including a memory device and an input device including a touch screen and a sensor, which causes a player to perform, within a predetermined time, a plurality of inputs including at least one input to be performed in synchronization with a predetermined timing and performs a predetermined game process in accordance with a result of the plurality of inputs, the game program causing the at least one processor to perform at least:
display a first input image in a predetermined area on the touch screen;
display a second input image in which images in a plurality of areas are drawn so as to be distinguishable from each other by the player, in the predetermined area in accordance with reception of an electrical signal indicating a sensed touch input on the first input image by the sensor;
determine whether a touch input has been performed on any of the images in the plurality of areas constituting the second input image based on a sensed touch input by the sensor;
branch process execution to perform a process in accordance with the image in the area on which the touch input has been performed; and
programmatically compare the timing of the touch input performed on the second input image and the position of the touch input performed on the second input image against a list of known timing values of touch inputs and positions of touch inputs on the second input image stored in the memory device to perform object controlling a predetermined object in a game space on the basis of a timing of the touch input on the second input image and a result of the process performed by the branch process execution, wherein
the second input image includes a first area image and a second area image,
in response to said programmatically comparing,
when a touch input is performed on the first area image and sensed by the sensor, the at least one processor is configured to control movement of the object based on the timing of the touch performed on the first area image; and
when a touch input is performed on the second area image and sensed by the sensor, the at least one processor is configured to control movement of the object based on the timing of the touch performed on the second area image; and the position and timing of a touch performed on a third input image having a single periphery, said position being inside the single periphery.

13. A computer-readable non-transitory storage medium having stored therein a game program executed by a processor of a game system, the game system including a memory device, an input device including a touch screen and a sensor, and a processing system that includes at least one processor coupled to the memory device and the touch screen, which causes a player to perform, within a predetermined time, a plurality of inputs including at least one input to be performed in synchronization with a predetermined timing and performs a predetermined game process in accordance with a result of the plurality of inputs, the game program causing the at least one processor to perform at least:
display a first input image in a predetermined area on the touch screen;
display a second input image in the predetermined area in accordance with reception of an electric signal indicating a sensed touch input on the first input image;
display a third input image in the predetermined area in accordance with reception of an electrical signal indicating a sensed touch input on the second input image by the sensor; and
programmatically compare the timing of the touch input performed on the second input image, and the timing and the touch position of the touch input performed on the third input image against a list of known timing values of touch inputs on the second input image and timing values and positions of touch inputs on the third input image stored in the memory device to perform object controlling a predetermined object in a game space on the basis of the timing of the touch input on the second input image and the touch position and the touching timing of a touch input on the third input image, wherein
the second input image includes a first area image and a second area image,
in response to said programmatically comparing
when a touch input is performed on the first area image and sensed by the sensor, the at least one processor is configured to control movement of the object based on the timing of the touch performed on the first area image; and
when a touch input is performed on the second area image and sensed by the sensor, the at least one processor is configured to control movement of the object based on the timing of the touch performed on the second area image; and the position and timing of a touch performed on the third input image having a single periphery, said position being inside the single periphery.

14. A game process control method for controlling a game system comprising a memory device, an input device including a touch screen and a sensor, and a processing system that includes at least one processor coupled to the memory device and the touch screen, which causes a player to perform, within a predetermined time, a plurality of inputs including at least one input to be performed in synchronization with a predetermined timing and performs a predetermined game process in accordance with a result of the plurality of inputs, the game process control method comprising:

displaying a first input image in a predetermined area on the touch screen;

displaying a second input image in which images in a plurality of areas are drawn so as to be distinguishable from each other by the player, in the predetermined area in accordance with reception of an electrical signal indicating a sensed touch input on the first input image by the sensor;

determining whether a touch input has been performed on any of the images in the plurality of areas constituting the second input image based on a sensed touch input by the sensor;

performing a process in accordance with the image in the area on which the touch input has been performed; and programmatically comparing the timing of the touch input performed on the second input image and the position of the touch input performed on the second input image against a list of known timing values of touch inputs and positions of touch inputs on the second input image stored in the memory device to perform object controlling a predetermined object in a game space on the basis of a timing of the touch input on the second input image and a result of the performed process, wherein the second input image includes a first area image and a second area image, in response to said programmatically comparing, when a touch input is performed on the first area image and sensed by the sensor, the at least one processor is configured to control movement of the object based on the timing of the touch performed on the first area image; and when a touch input is performed on the second area image and sensed by the sensor, the at least one processor is configured to control movement of the object based on: the timing of the touch performed on the second area image; and the position and timing of a touch performed on a third input image having a single periphery, said position being inside the single periphery.

15. A game process control method for controlling a game system comprising a memory device, an input device including a touch screen and a sensor, and a processing system that includes at least one processor coupled to the memory device and the touch screen, which causes a player to perform, within a predetermined time, a plurality of inputs including at least one input to be performed in synchronization with a predetermined timing and performs a predetermined game process in accordance with a result of the plurality of inputs, the game process control method comprising:

displaying a first input image in a predetermined area on the touch screen;

displaying a second input image in the predetermined area in accordance with reception of an electrical signal indicating a sensed touch input on the first input image by the sensor;

displaying a third input image in the predetermined area in accordance with reception of an electrical signal indicating a sensed touch input on the second input image by the sensor; and programmatically comparing the timing of the touch input performed on the second input image, and the timing and the touch position of the touch input performed on the third input image against a list of known timing values of touch inputs on the second input image and timing values and positions of touch inputs on the third input image stored in the memory device to perform object controlling a predetermined object in a game space on the basis of the timing of the touch input on the second input image and the touch position and the touching timing of a touch input on the third input image, wherein the second input image includes a first area image and a second area image, in response to said programmatically comparing, when a touch input is performed on the first area image and sensed by the sensor, the at least one processor is configured to control movement of the object based on the timing of the touch performed on the first area image; and when a touch input is performed on the second area image and sensed by the sensor, the at least one processor is configured to control movement of the object based on the timing of the touch performed on the second area image; and the position and timing of a touch performed on the third input image having a single periphery, said position being inside the single periphery.

16. A game apparatus which causes a player to perform, within a predetermined time, a plurality of inputs including at least one input to be performed in synchronization with a predetermined timing and performs a predetermined game process in accordance with a result of the plurality of inputs, the game apparatus comprising a memory device, an input device including a touch screen and a sensor, and a processing system that includes at least one processor coupled to the memory device and the touch screen, the at least one processor configured to perform at least:

display a first input image in a predetermined area on the touch screen;

display a second input image in which images in a plurality of areas are drawn so as to be distinguishable from each other by the player, in the predetermined area in accordance with reception of an electrical signal indicating a sensed touch input on the first input image by the sensor;

determine whether a touch input has been performed on any of the images in the plurality of areas constituting the second input image based on a sensed touch input by the sensor;

branch process execution to perform a process in accordance with the image in the area on which the touch input has been performed; and programmatically compare the timing of the touch input performed on the second input image and the position of the touch input performed on the second input image against a list of known timing values of touch inputs and positions of touch inputs on the second input image stored in the memory device to perform object controlling a predetermined object in a game space on the basis of the timing of the touch input on the second input image and a result of the process performed by the branch process execution, wherein the second input image includes a first area image and a second area image, in response to said programmatically comparing, when a touch input is performed on the first area image and sensed by the sensor, the at least one processor is configured to control movement of the object based on the timing of the touch performed on the first area image; and when a touch input is performed on the second area image and sensed by the sensor, the at least one processor is configured to control movement of the object based on the timing of the touch performed on the second area image; and the position and timing of a touch performed on a third input image having a single periphery, said position being inside the single periphery.

17. A game apparatus which causes a player to perform, within a predetermined time, a plurality of inputs including at least one input to be performed in synchronization with a predetermined timing and performs a predetermined game process in accordance with a result of the plurality of inputs, the game apparatus comprising a memory device, an input device including a touch screen and a sensor, and a processing system that includes at least one processor coupled to the memory device and the touch screen, the at least one processor configured to perform at least:

display a first input image in a predetermined area on the touch screen;

display a second input image in the predetermined area in accordance with reception of an electrical signal indicating a sensed touch input on the first input image by the sensor;

display a third input image in the predetermined area in accordance with reception of an electrical signal indicating a sensed touch input on the second input image by the sensor; and programmatically compare the timing of the touch input performed on the second input image, and the timing and the touch position of the touch input performed on the third input image against a list of known timing values of touch inputs on the second input image and timing values and positions of touch inputs on the third input image stored in the memory device to perform object controlling a predetermined object in a game space on the basis of the timing of the touch input on the second input image and the touch position and the touching timing of a touch input on the third input image, wherein the second input image includes a first area image and a second area image, in response to said programmatically comparing, when a touch input is performed on the first area image and sensed by the sensor, the at least one processor is configured to control movement of the object based on the timing of the touch performed on the first area image; and when a touch input is performed on the second area image and sensed by the sensor, the at least one processor is configured to control movement of the object based on the timing of the touch performed on the second area image; and the position and timing of a touch performed on the third input image having a single periphery, said position being inside the single periphery.

* * * * *